United States Patent
Qiu et al.

(10) Patent No.: US 9,898,700 B2
(45) Date of Patent: Feb. 20, 2018

(54) METHOD, APPARATUS, AND ARTIFICIAL INTELLIGENCE SERVER FOR DETERMINING ARTIFICIAL INTELLIGENCE BEHAVIOR

(71) Applicant: TENCENT TECHNOLOGY (SHENZHEN) COMPANY LIMITED, Shenzhen (CN)

(72) Inventors: Linhui Qiu, Shenzhen (CN); Xuxin Wang, Shenzhen (CN); Jianhui Yao, Shenzhen (CN); Yong Zhong, Shenzhen (CN); Min Yang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 513 days.

(21) Appl. No.: 14/596,663

(22) Filed: Jan. 14, 2015

(65) Prior Publication Data
US 2015/0154502 A1    Jun. 4, 2015

Related U.S. Application Data

(63) Continuation of application No. PCT/CN2014/080401, filed on Jun. 20, 2014.

(30) Foreign Application Priority Data

Nov. 29, 2013 (CN) .......................... 2013 1 0632411

(51) Int. Cl.
| | | |
|---|---|---|
| *G06F 17/00* | (2006.01) | |
| *G06N 5/02* | (2006.01) | |
| *G06N 5/04* | (2006.01) | |

(52) U.S. Cl.
CPC ................................. *G06N 5/048* (2013.01)

(58) Field of Classification Search
CPC ............ G06N 5/025; G06N 5/02; G06N 5/04; G06N 5/027
(Continued)

(56) References Cited

U.S. PATENT DOCUMENTS

2006/0069863 A1    3/2006 Palmer et al.
2008/0263636 A1    10/2008 Gusler et al.
(Continued)

FOREIGN PATENT DOCUMENTS

CN    1797412 A    7/2006
CN    101288047 A    10/2008
(Continued)

OTHER PUBLICATIONS

Sparse sampling for sensing temporal data—building an optimized envelope Menachem Domb; Guy Leshem; Elisheva Bonchek-Dokow; Esther David; Yuh-Jye Lee 2016 Conference on Technologies and Applications of Artificial Intelligence (TAAI) Year: 2016 pp. 241-247 IEEE Conference Publications.*

(Continued)

*Primary Examiner* — Michael B Holmes
(74) *Attorney, Agent, or Firm* — Anova Law Group, PLLC

(57) ABSTRACT

According to methods, apparatus and AI servers for determining an AI behavior, a protocol-requesting command sent by an application logic server can be received. The protocol-requesting command can contain an application identifier, a notification message, and current environment data. From a plurality of preset AI systems, an AI system corresponding to the application identifier can be found. The AI system can be formed by a preset plurality of components that include one or more classifying components. From the AI system, a classifying component corresponding to the notification message can be found. The classifying component can be (Continued)

mounted with at least one behavior component. From the classifying component corresponding to the notification message, a behavior component matching the current environment data can be obtained. An AI behavior can be determined based on the obtained behavior component matching the current environment data.

17 Claims, 9 Drawing Sheets

(58) Field of Classification Search
USPC .......................................................... 706/47
See application file for complete search history.

(56) References Cited

U.S. PATENT DOCUMENTS

| | | | | |
|---|---|---|---|---|
| 2011/0276396 | A1* | 11/2011 | Rathod | G06F 17/30867 705/14.49 |
| 2014/0204816 | A1* | 7/2014 | Ismail | H04W 52/0258 370/311 |
| 2015/0154495 | A1* | 6/2015 | Qiu | G06N 5/048 706/14 |
| 2015/0154502 | A1* | 6/2015 | Qiu | G06N 5/048 706/47 |

FOREIGN PATENT DOCUMENTS

| | | |
|---|---|---|
| CN | 101548300 A | 9/2009 |
| CN | 102073487 A | 5/2011 |
| CN | 102215209 A | 10/2011 |
| CN | 102521754 A | 6/2012 |
| CN | 102708290 A | 10/2012 |
| TW | 200847004 A | 12/2008 |
| TW | 200904101 A | 1/2009 |
| TW | 200907849 A | 2/2009 |

OTHER PUBLICATIONS

Unsupervised Learning for Analyzing the Dynamic Behavior of Online Banking Fraud Guénaäl Cabanes; Younés Bennani; Nistor Grozavu 2013 IEEE 13th International Conference on Data Mining Workshops Year: 2013 pp. 513-520 IEEE Conference Publications.*
Descriptive analysis of Hash Table based Intrusion Detection Systems Saumya Raj; Rajesh R 2016 International Conference on Data Mining and Advanced Computing (SAPIENCE) Year: 2016 pp. 233-240 IEEE Conference Publications.*
Correspondence-Free Determination of the Affine Fundamental Matrix Stefan Lehmann; Andrew P. Bradley; John Williams; Peter J. Kootsookos; L. Clarkson IEEE Transactions on Pattern Analysis and Machine Intelligence Year: 2007, vol. 29, Issue: 1 pp. 82-97 IEEE Journals & Magazines.*
Taiwan Intellectual Property Office (TIPO) Office Action 1 for 103138718 dated Nov. 2, 2015 pp. 1-5.
The World Intellectual Property Organization (WIPO) International Search Report for PCT/CN2014/080401 dated Sep. 29, 2014 pp. 1-3.
The State Intellectual Property Office of the People's Republic of China (SIPO) Office Action 1 for 201310632411.8 dated Nov. 22, 2016 pp. 1-9.

* cited by examiner

METHOD, APPARATUS, AND ARTIFICIAL INTELLIGENCE SERVER FOR DETERMINING ARTIFICIAL INTELLIGENCE BEHAVIOR

CROSS-REFERENCES TO RELATED APPLICATIONS

This application is a continuation application of PCT Patent Application No. PCT/CN2014/080401, filed on Jun. 20, 2014, which claims priority to Chinese Patent Application No. 201310632411.8, filed on Nov. 29, 2013, the entire contents of both of which are incorporated herein by reference.

FIELD OF THE DISCLOSURE

The present disclosure generally relates to the field of artificial intelligence and, more particularly, relates to methods, apparatus, and artificial intelligence servers for determining an artificial intelligence behavior.

BACKGROUND

Artificial intelligence (AI) refers to technologies that simulate human thinking and action by using modern tools such as computers. With continuous advancement of AI technologies, AI technologies have been applied to various aspects of industrial manufacturing and human life.

For example, when the AI technologies are applied to a game application program, an entity having human-like behaviors is generated. The entity is an AI agent. Because the AI agent can exhibit intelligent behaviors and activities similar to intelligent behaviors and activities of a human being, or can exhibit characteristics consistent with a player's thinking and perception, the AI agent can improve playability of the game application program.

During the design of a specific application program containing AI technologies, a human-like behavior that is exhibited by an AI agent is called an AI behavior. How to determine the AI behavior is the key to making the AI agent of the application program exhibit human-like behaviors. For example, during the design of a game application program involving interactions between a human player and a computer, determining AI behaviors can ensure the AI agent in the game can have behaviors matching the player.

Conventionally, before determining an AI behavior, a programmer usually needs to translate logic of an application program into corresponding code after the logic of the application program is designed. An AI system is thus formed by a combination of the code. That is, conventionally, before determining an AI behavior, for each application program, a set of corresponding code needs to be developed. During the determining of an AI behavior, an application logic server looks up corresponding code according to current environment data of the AI agent, determines the AI behavior, and thus controls the AI agent to execute the determined AI behavior, such that the AI agent exhibits the AI behavior matching the current environment data.

However, conventional methods have at least the following problems. Because conventional methods need to determine an AI behavior by using an application logic server to run code corresponding to an application program, operation is complicated. In addition, during the determining of the AI behavior using the application logic server, resources on the application logic server is consumed, and running speed of the application program is thus affected.

BRIEF SUMMARY OF THE DISCLOSURE

One aspect of the present disclosure includes methods for determining an artificial intelligence (AI) behavior. In an exemplary method, a protocol-requesting command sent by an application logic server can be received. The protocol-requesting command can contain an application identifier, a notification message, and current environment data. From a plurality of preset AI systems, an AI system corresponding to the application identifier can be found. The AI system can be formed by a preset plurality of components. The preset plurality of components can include one or more classifying components. From the AI system corresponding to the application identifier, a classifying component corresponding to the notification message can be found. The classifying component can be mounted with at least one behavior component. From the classifying component corresponding to the notification message, a behavior component matching the current environment data can be obtained. An AI behavior can be determined based on the obtained behavior component matching the current environment data.

Another aspect of the present disclosure includes apparatus for determining an AI behavior. An exemplary apparatus can include a receiving module, a finding module, an obtaining module and a determining module. The receiving module can be configured to receive a protocol-requesting command sent by an application logic server. The protocol-requesting command can contain an application identifier, a notification message, and current environment data. The finding module can be configured to find, from a plurality of preset AI systems, an AI system corresponding to the application identifier. The AI system can be formed by a preset plurality of components, the preset plurality of components include one or more classifying components. The finding module can be further configured to find, from the AI system corresponding to the application identifier, a classifying component corresponding to the notification message. The classifying component can be mounted with at least one behavior component. The obtaining module can be configured to obtain, from the classifying component corresponding to the notification message, a behavior component matching the current environment data. The determining module can be configured to determine an AI behavior based on the obtained behavior component matching the current environment data.

Another aspect of the present disclosure includes AI servers for determining an AI behavior. An exemplary AI server can include the apparatus for determining an AI behavior.

Another aspect of the present disclosure includes a non-transitory computer-readable medium having computer program. When being executed by a processor, the computer program performs a method for determining an artificial intelligence (AI) behavior. The method includes: receiving a protocol-requesting command sent by an application logic server, wherein the protocol-requesting command contains an application identifier, a notification message, and current environment data; finding, from a plurality of preset AI systems, an AI system corresponding to the application identifier, wherein the AI system is formed by a preset plurality of components, the preset plurality of components including one or more classifying components; finding, from the AI system corresponding to the application identifier, a classifying component corresponding to the notification message, wherein the classifying component is mounted with at least one behavior component; obtaining, from the classifying component corresponding to the notification message, a behavior component matching the current environment data; and determining an AI behavior based on the obtained behavior component matching the current environment data.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the disclosure.

DETAILED DESCRIPTION

Figure 1:
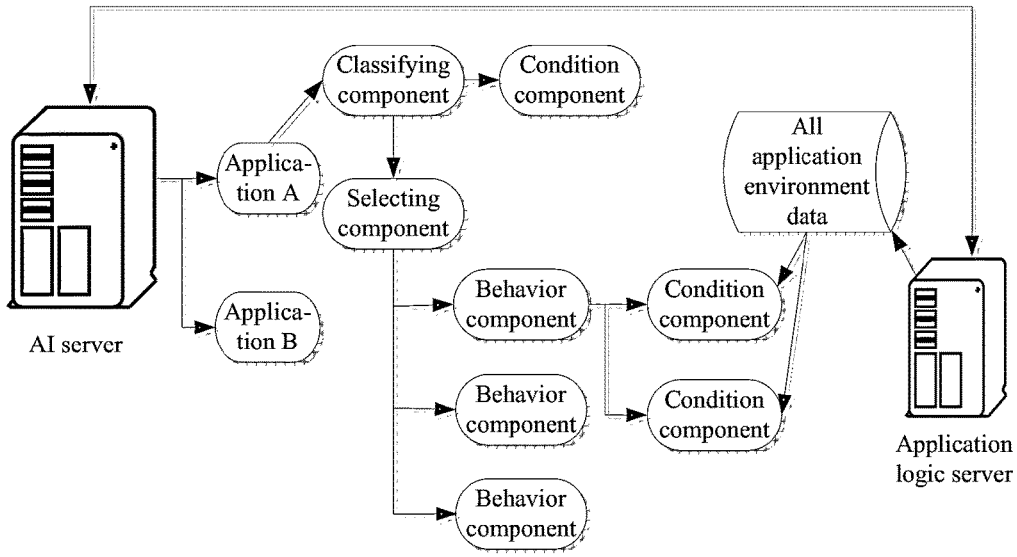
FIG. 1 depicts an exemplary environment for implementing methods for determining an AI behavior in accordance with various disclosed embodiments.

Reference will now be made in detail to exemplary embodiments of the disclosure, which are illustrated in the accompanying drawings.

With rapid development of computer technology, more and more application programs are applied to people's life and bring great convenience and fun into people's life. With rapid development of AI technologies, more and more AI technologies are applied to application programs on modern tools such as computers, thus enabling the modern tools such as computers to simulate and perform behaviors similar to human thinking and human behaviors.

When performing human-like behaviors, a modern tool such as a computer is playing a role of an AI Agent. An AI agent generally refers to an entity that has goal(s), behavior(s) and knowledge, and operates independently in a certain environment. A typical example of an AI agent is a monster or non-player character (NPC) in an application program. In addition, during operation of an application program of war between human and computer, an AI agent can be a role played by the computer. A behavior performed by an AI agent that is similar to human thinking and human behavior is referred to an AI behavior.

During the design of an application program related to AI technologies, usually a planner of the application program designs a logic relationship between AI agents in the application program. Next, a programmer translates or compiles the logic relationship between the AI agents in the application program into corresponding code via certain specific programming language. An AI system is thus formed via combining the code.

However, because different application programs contain different AI agents, and one application program can contain and implement different AI agents. Therefore, if behaviors exhibited by each AI agent are all achieved via compiling the code, operation of designing AI systems can be complex, and can take up significant human resources. In this case, during the determining of an AI behavior of an AI agent in an application program based on a designed AI system, operation can be more complex.

In view of the problems set forth above and other problems, based on components in a software system, various embodiments provide a method for designing an AI system. In addition, according to an AI system based on component design, methods for determining an AI behavior are provided herein. In order to illustrate the methods for determining an AI behavior in accordance with various embodiments, various components involved in the exemplary methods are explained as follows.

Components in accordance with various embodiments can be obtained via encapsulating code that can achieve specific functions. A component can have a function independent of other components. Interface between components can be specified by a contract. A component can have a clear dependence on context, can be deployed independently, and can be assembled. In various embodiments, 'encapsulating code' can also be referred to as 'packaging code'.

In order to facilitate the subsequent forming of the AI system via the components, in the methods in accordance with various embodiments, code that can achieve specific functions can be encapsulated in advance. Thus, the encapsulated components can subsequently be directly used. In addition, to ease operation of using the components, after the components are encapsulated, corresponding detailed information can be configured for each component.

Further, for illustrative purposes, in various embodiments, various encapsulated components can be classified according to the functions achieved by the components. Thus, the components can include classifying component, selecting component, condition component, and/or behavior component.

A condition component can refer to a component that executes a function of judging condition(s) and returns result of the judging, e.g., a component for judging whether a player currently has a K-of-Hearts card. A behavior component can refer to a component that executes a specified function (i.e., a function that is set), e.g., a component for playing a K-of-Hearts card. A selecting component can refer to a component that can select a component for executing based on certain filtering rule(s). The filtering rules can include, but are not limited to, maximum-weight-selection mode, random-selection mode, sequential-selection mode, or any other appropriate modes. In addition, to classify and manage the various components, a classifying component can be introduced. The classifying component is a component for classifying and managing the various components, and is usually not for operating functions. The classifying component can be used for managing the components.

Optionally, the components can also include a complex component. The complex component can be formed to include classifying component(s), selecting component(s), condition component(s), and/or behavior component(s). The complex component can be used as a component collection having a certain AI logic meaning A planner can establish various component libraries according to actual needs. The various component libraries can be called by various AI agents, to improve efficiency of AI design.

Optionally, the disclosed methods can involve AI rule(s). The AI rules can determine behavior of an AI agent under a certain condition. For example, in a game called 'Legend of Heroes', when an AI agent does not have 'full blood' (i.e., a certain level of points or energy in the 'Legend of Heroes' game), the AI agent plays a medicine card. The medicine card is a certain playing card used in the 'Legend of Heroes' game.

Optionally, the disclosed methods can involve an AI rule library. The AI rule library can include a configured collection of AI rules that can be for general usage. The AI rules can include, e.g., AI behavior configuration files that match logic of corresponding AI behaviors, respectively. For example, in the 'Legend of Heroes' game, the AI rule library can include configured AI trusteeship. An AI behavior configuration file can be configured using, e.g., selecting component(s), behavior component(s), and/or condition component(s), such that the AI behavior configuration file has the components combined via appropriate mounting topology, and thus can implement an AI behavior that is consistent with logic corresponding to a preset AI behavior as designed by the planner of the application program.

FIG. 1 depicts an exemplary environment for implementing methods for determining an AI behavior in accordance with various disclosed embodiments. The environment for implementing methods for determining AI behavior, in accordance with various disclosed embodiments, can include an application logic server and an AI server. An AI system of at least one application can be mounted on the AI server. AI systems of various applications can be implemented via calling preset components.

For example, as shown in FIG. 1, a type of mounting between components can include the following. A classifying component can have at least one selecting component or at least one condition component mounted thereon. A selecting component can have at least one behavior component mounted thereon. A behavior component can have at least one condition component mounted thereon. When the application logic server and the AI server interact to complete a method for determining AI behavior, the application logic server needs to synchronize all application program environment data to, or with, the AI server.

As used herein, wherever applicable, 'application program can be used interchangeably with 'application'. An application or application program can refer to any appropriate software program that achieves a certain specific purpose. As used herein, unless otherwise specified, 'having a component mounted' can be used interchangeably with 'being mounted with a component'.

Figure 2:
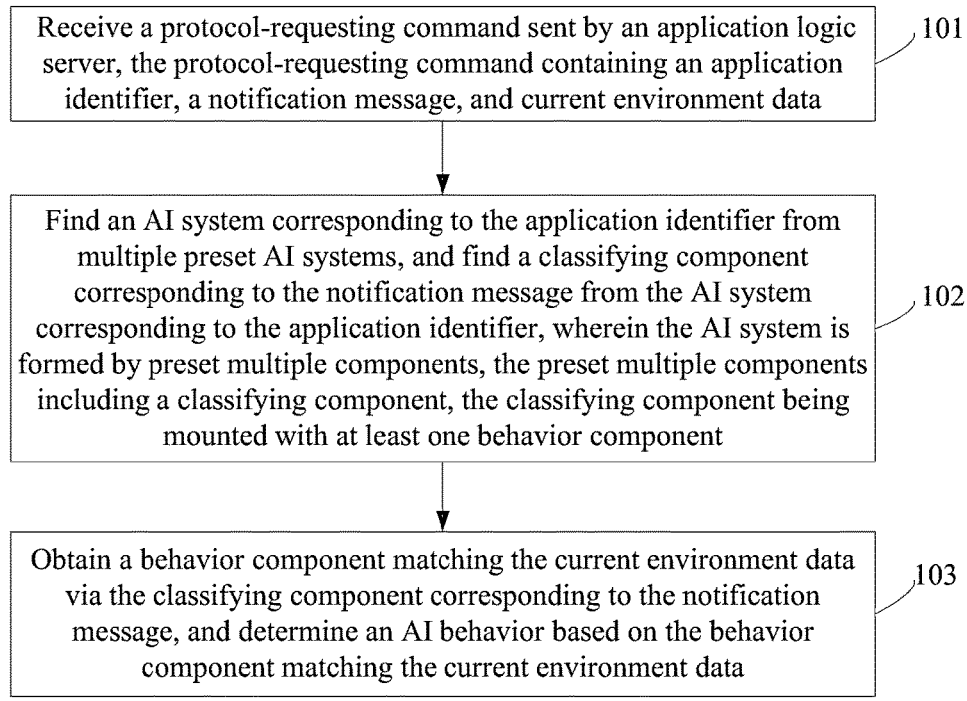
FIG. 2 depicts a flow diagram of an exemplary method for determining an AI behavior in accordance with various disclosed embodiments.

Based on the above, various embodiments provide methods for determining AI behavior. FIG. 2 depicts a flow diagram of an exemplary method for determining an AI behavior in accordance with various disclosed embodiments. As shown in FIG. 2, the method can include the following exemplary steps.

In Step 101, a protocol-requesting command sent by an application logic server is received. The protocol-requesting command can contain an application identifier, a notification message, and current environment data.

In Step 102, an AI system corresponding to the application identifier is found from multiple preset AI systems, and a classifying component corresponding to the notification message is found from the AI system corresponding to the application identifier. The AI system can be formed by preset multiple components. The preset multiple components can include one or more classifying component. The classifying component can have at least one behavior component mounted thereon.

In Step 103, a behavior component matching the current environment data is obtained via the classifying component corresponding to the notification message, and an AI behavior is determined based on the behavior component matching the current environment data.

Optionally, before finding the AI system corresponding to the application identifier from multiple preset AI systems, the method can further include the following steps. Code for accomplishing specific functions is encapsulated into components for accomplishing the specific functions. The components can include selecting component(s), behavior component(s), and condition component(s). Multiple groups of components are selected from the components. For each group of components, a classifying component can be configured for managing the group of components. One or more of each group of components and the classifying component for managing the group of components can be used to form an AI system corresponding to an application program. Thus, multiple AI systems respectively corresponding to multiple application programs can be obtained.

Optionally, a classifying component can have at least one selecting component or at least one condition component mounted thereon. A selecting component can have at least one behavior component mounted thereon. A behavior component can have at least one condition component mounted thereon.

Optionally, according to practical needs, a component can be indirectly mounted on another component. For example, a classifying component can have a behavior component mounted, and the behavior g component can have a condition component mounted. In this case, it can be referred to as that the classifying component has the condition component mounted.

Optionally, the obtaining of the behavior component matching the current environment data via the classifying component corresponding to the notification message can include, but is not limited to the following steps. Multiple condition components mounted on the classifying component corresponding to the notification message can be scanned, to determine at least one condition component matching the current environment data. At least one behavior component mounted with the at least one condition component matching the current environment data can be activated. A selecting component on which the at least one behavior component is mounted can select, from the at least one behavior component, a behavior component matching the current environment data.

In various embodiments, scanning the condition components mounted on the classifying component can refer to traversing the condition components. That is, each condition components mounted on the classifying component is visited one at a time in a certain appropriate order. During the visiting, information can be obtained from the each condition components.

Optionally, before the protocol-requesting command sent by an application logic server is received, the following process can be included. All application program environment data synchronized to the AI server can be received. In this case, multiple condition components mounted on the classifying component corresponding to the notification message can be scanned, to determine at least one condition component matching the current environment data. The scanning and the determining can include the following steps. For example, the scanning of the multiple condition components to determine the at least one condition component can include, but is not limited to the following process. Among the all application program environment data, application program environment data corresponding to at least one condition component of the multiple condition components is found. It can be determined whether the current environment data satisfy the application program environment data corresponding to the at least one condition component of the multiple condition components. When the current environment data satisfy the application program environment data corresponding to the at least one condition component of the multiple condition components, the at least one condition component satisfied by the current environment data can be determined to be the at least one condition component matching the current environment data.

In the method according to various disclosed embodiments, an AI system corresponding to an application identifier can be found from multiple preset AI systems. A classifying component corresponding to a notification message can be found from the AI system corresponding to the application identifier. A behavior component matching current environment data can be obtained via the classifying component corresponding to the notification message. An AI behavior can be determined based on the behavior component matching the current environment data. Thus, an AI behavior no longer needs to be determined via operation code. An AI behavior can be directly determined by determining an AI behavior component from multiple components that form the AI system. The operation can be simplified. In addition, the operation of determining an AI behavior can be achieved without using an application logic server. Thus, operation speed of the application program can be improved, and users can be provided with desired operation experience.

Figure 3:
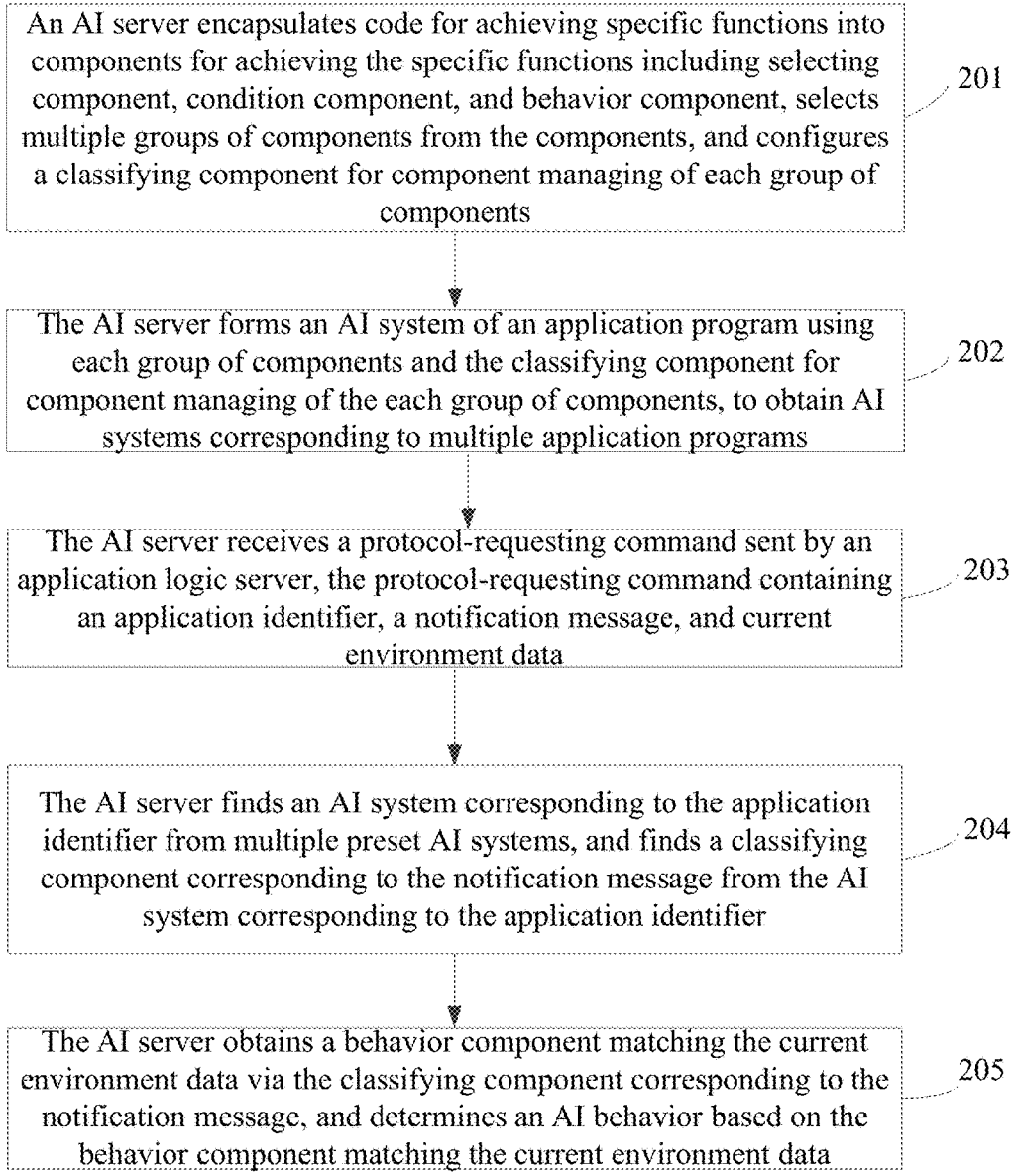
FIG. 3 depicts a flow diagram of another exemplary method for determining an AI behavior in accordance with various disclosed embodiments.

FIG. 3 depicts a flow diagram of another exemplary method for determining an AI behavior in accordance with various disclosed embodiments. The exemplary method can be implemented on an AI server in an exemplary environment, e.g., as shown in FIG. 1.

In various embodiments, an AI server can have AI systems of various application programs mounted thereon. The AI systems of the various application programs can be obtained by combining various encapsulated components. An application logic server can include a server that provides specific application program logic service for multiple client terminals. The AI server can determine AI behaviors of an AI agent from an AI system according to current environment data, by receiving interaction protocol(s) of the application logic server and users of the client terminals.

Referring to FIG. 3, an exemplary method for determining an AI behavior can include the follow steps. In Step 201, an AI server encapsulates code for achieving specific functions into components for achieving the specific functions. The components can include classifying component, selecting component, condition component, and/or behavior component. The AI server can select multiple groups of components from the components, and, for each group of components, can configure a classifying component for managing the group of components.

In order to simplify operation of AI systems of various application programs, the AI server can encapsulate code for achieving specific functions into components for achieving the specific functions. An encapsulated component can be a single-input single-output software entity, can have relatively independent function(s) and have versatility. When various application programs need to achieve similar or same functions, the functions can be achieved by calling the same components. Methods for encapsulating code for achieving specific functions into components for achieving specific functions are not limited in the present disclosure.

In addition, because functions achieved by various components can be different, after the code is encapsulated into components, the encapsulated components can be divided into, e.g., selecting component, condition component, and/or behavior component, according to the functions achieved by the components. Further, in order to classify and manage the components and ensure that, during the usage of the components, the most appropriate component can be searched with the least time consumed, the AI server can divide the encapsulated components into groups and, for each group of components, configure a classifying component for managing the group of components. After the classifying components are configured, during the usage of the components, the AI server can select components via a corresponding classifying component according to the functions to be achieved.

Specific contents of the classifying components can vary, and can be determined according to logic of application programs, without limitation. In actual applications, e.g., in applications of playing cards, board games, etc., the classifying components can include a classifying component of playing basic playing cards, a classifying component of determining status of AI agent props, or classifying components of any other appropriate operations.

There can be many various types of methods for mounting between the encapsulated components. In specific application programs, the method for mounting components can be determined according to input-output relationships between the various components.

Figure 4A:
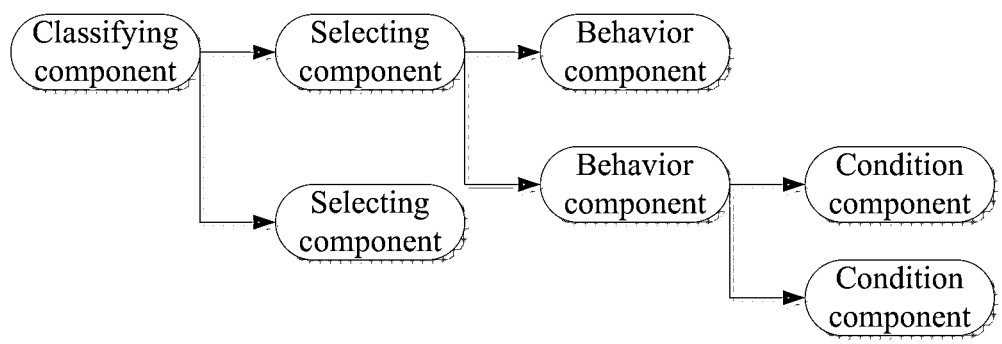
FIG. 4(a) depicts a structure diagram of component mounting in accordance with various disclosed embodiments.

For example, FIG. 4(a) depicts a structure diagram of component mounting in accordance with various disclosed embodiments. As shown in FIG. 4(a), a classifying component can have at least one selecting component mounted thereon. A selecting component can have at least one behavior component mounted thereon. A behavior component can have at least one condition component mounted thereon.

Figure 4B:
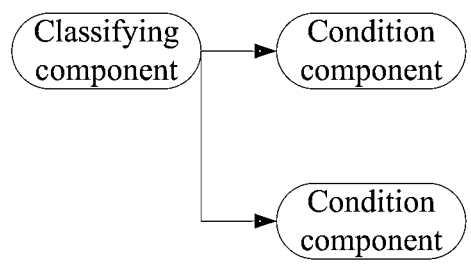
FIG. 4(b) depicts a structure diagram of component mounting in accordance with various disclosed embodiments.

In addition, FIG. 4(b) depicts a structure diagram of component mounting in accordance with various disclosed embodiments. As shown in FIG. 4(b), a classifying component can have at least one condition component directly mounted thereon.

In Step 202, the AI server forms an AI system of an application program using one or more of each group of components and the classifying component for managing the each group of components, to obtain or establish AI systems respectively corresponding to multiple application programs.

For example, after the components are encapsulated, the AI server can form an AI system of an application program using each group of components and the classifying component for managing the each group of components, according to logic relationship(s) in the application program. Such a process of combining various components can be performed repeatedly, to obtain AI systems respectively corresponding to multiple application programs. To distinguish the AI system corresponding to each application program, an identifier can be set for each AI system. The identifier can uniquely correspond to, i.e., have a one-to-one correspondence with, an identifier of the application program that corresponds to the identifier. Thus, during the determining of the AI system of a certain application program, only the identifier of the AI system that corresponds to the identifier of the application program needs to be looked up and found. In various embodiments, one AI system can correspond to one application program.

By combining components to form AI systems of various application programs, the formation of the AI systems can be achieved simply by combining encapsulated components according to logic of the application programs. Compiling code according to logic of the application programs is thus no longer necessary. Operation of forming AI systems of application programs can thus be simpler. In addition, because each component can have a single function, the components can thus be arbitrarily assembled according to a certain logic relationship. Therefore, one component can be applied to various application programs or various AI agents of one application program. The encapsulated components can thus have desired versatility.

Steps 201-202 can be basic steps for designing an AI system based on components. Via Steps 201-202, AI system of at least one application program can be designed as a basis for calling components, and further as a basis for subsequently determining AI behaviors for AI agents. Therefore, Steps 201-202 does not need to be performed every time during the determining of AI behaviors, and can be optionally performed according to needs of actual application.

In Step 203, the AI server receives a protocol-requesting command sent by an application logic server. The protocol-requesting command can contain an application identifier, a notification message, and current environment data.

During interaction with a user of a client terminal, when the application logic server needs the AI server to accordingly implement a certain AI behavior, the application logic server can send a protocol-requesting command to the AI server. In order to trigger steps that can subsequently determine the AI behavior according to the protocol-requesting command, the AI server needs to receive the protocol-requesting command sent by the application logic server. The methods for the application logic server to send the protocol-requesting command to the AI server, and the method for the AI server to receive the protocol-requesting command sent by the application logic server can be any appropriate methods, and are not limited in the present disclosure.

Because the AI server can have various AI systems mounted thereon, in order to distinguish AI systems of various different application programs, the protocol-requesting command may need to contain an application identifier, i.e., an identifier of the application program. In addition, the AI server classifies and manages various components stored internally, to obtain various classifying components. Thus, in order to clearly inform the AI server of the type or kind of the certain behavior that the application logic server currently wants the AI server to match, the protocol-requesting command may need to contain a notification message.

The AI server can locate a corresponding classifying component according to the notification message, in order to ensure that the behavior that the application logic server currently wants the AI server to match can be subsequently selected from or via the classifying component corresponding to the notification message.

Further, the AI server may need to determine next behavior of a current AI agent according to the current state of a player or other AI agents. Therefore, the protocol-requesting command may need to contain current environment data. The current environment data is not limited in the present disclosure and can be set according to needs of actual applications. For example, in application programs of playing cards, board games, etc. for a human to play against a computer, after a player plays a playing card having a symbol 10-of-Hearts, in order for the AI server to determine a playing card that the AI agent needs to play according to the 10-of-Hearts card played by the player, the data describing the player playing the 10-of-Hearts card can be the current environment data and such current environment data can be contained in the protocol-requesting command.

For ease of description, in various embodiments where an application program of playing cards is described, a playing card can be referred to as a card. 'A playing card having a symbol 10-of-Hearts' can also be referred to as 'a 10-of-Hearts card'. Playing cards having other symbols can be referred to in a similar manner. 'A playing card' can be referred to as 'a card'.

In Step 204, the AI server finds an AI system corresponding to the application identifier from multiple preset AI systems, and finds a classifying component corresponding to the notification message from the AI system corresponding to the application identifier. The AI server can have various AI systems mounted thereon, and the various AI systems can have various classifying components respectively manage various components. Therefore, after the AI server receives the protocol-requesting command sent by the application logic server, the AI server can find an AI system corresponding to the application identifier from multiple preset AI systems, and can find a classifying component corresponding to the notification message from the AI system corresponding to the application identifier.

The AI server can find an AI system corresponding to the application identifier from multiple preset AI systems in various ways. For example, the AI server can store AI systems of various different application programs in different internal storage structures, and apply labels to the storage structures for storing the AI systems of the application programs. The labels can respectively match the identifiers of the AI systems of the application programs. In this case, after the AI server receives the protocol-requesting command containing the application identifier, the AI server can look up and find the AI system corresponding to the application identifier from the multiple preset AI systems, via looking up and finding the storage structure matching the application identifier from the labels corresponding to the different storage structures.

Further, after finding the AI system corresponding to the application identifier, the AI system can find, via the notification message, a classifying component corresponding to the notification message from the AI system corresponding to the application identifier.

For example, when the notification message includes a message that informing the AI agent of playing a card, the AI server can locate a classifying component of playing basic playing cards. In addition, the AI server can subsequently obtain a behavior component from the classifying component of playing basic playing cards, to determine the AI behavior of the AI agent.

In Step 205, the AI server obtains a behavior component matching the current environment data from the classifying component corresponding to the notification message, and determines an AI behavior based on the behavior component matching the current environment data.

The AI server can receive a protocol-requesting command sent by an application logic server in order to accomplish a purpose of making the current AI agent perform a behavior to match the behaviors of players or other AI agents. That is, the AI server may need to determine a behavior to match the behavior of players or other AI agents. In addition, the behavior performed by AI agent matches the current environment data. Therefore, the AI server may need to obtain a behavior component matching the current environment data from the classifying component corresponding to the notification message. After the AI server obtains a behavior component matching the current environment data, the AI server can determine an AI behavior based on the obtained behavior component matching the current environment data. The behavior component matching the current environment data can include the behavior that AI server determines to match the current environment data.

The AI server can obtain a behavior component matching the current environment data from the classifying component corresponding to the notification message in various ways. For example, the components can be mounted as shown in FIG. 4(a), i.e., a classifying component can have at least one selecting component mounted thereon, a selecting component can have at least one behavior component mounted thereon, and a behavior component can have at least one condition component mounted thereon. Having such a mounted structure, during the determining of the AI behavior by the AI server, the AI server needs to integrate the current environment data into the process of determining. When the current environment data satisfy a condition corresponding to a preset condition component, the AI server can decide to perform a certain behavior. When the current environment data do not satisfy the condition corresponding to the preset condition component, the AI server can decide not to perform the certain behavior.

Therefore, the AI server can obtain a behavior component matching the current environment data from the classifying component corresponding to the notification message in processes including, but not limited to, the follow steps. For example, multiple condition components mounted on the classifying component corresponding to the notification message can be scanned, to determine at least one condition component matching the current environment data. At least one behavior component mounted on the at least one condition component matching the current environment data can be activated. A selecting component mounted with at least one behavior component can select a behavior component matching the current environment data from the at least one behavior component, according to preset filtering rule(s).

The filtering rules can include, but are not limited to, a maximum-weight-selection mode, a random-selection mode, a sequential-selection mode, or any other appropriate modes. In different application programs, or for different AI agents in different environments, the AI behaviors exhibited can be different. Therefore, when the AI server obtains a behavior component matching the current environment data from the classifying component corresponding to the notification message, the behavior component needs to be determined based on the current environment data. Even in the same environment, a behavior component may need to be determined according appropriate filtering rules.

Optionally, contents involved in an application program, e.g., rules, can usually be determined via judging relationship between data. Therefore, before the AI server receives the protocol-requesting command sent by the application logic server, the method can further include the following step(s). That is, AI server can receive all application program environment data synchronized by the application logic server. The all application program environment data can include all data involved for running the application program.

The AI server can receive the all application program environment data synchronized by the application logic server in various ways. For example, when the application logic server synchronizes the all application program environment data via a socket mode, the AI server can receive the all application program environment data synchronized by the application logic server via the socket mode.

In addition, when the application logic server synchronizes the all application program environment data, full-synchronization mode or incremental-synchronization mode can be used. When the application logic server synchronizes the all application program environment data using a certain method, the AI server can receive the all application program environment data synchronized by the application logic server using the same method correspondingly.

After the AI server receives the all application program environment data synchronized by the application logic server, the AI server can correspondingly scan multiple condition components mounted on the classifying component corresponding to the notification message, to determine at least one condition component matching the current environment data. Such a process can include, but is not limited to the following steps. Among the all application program environment data, application program environment data corresponding to at least one condition component of the multiple condition components is found. Accordingly, the at least one condition component corresponding to the application program environment data can be found from the multiple condition components (mounted on the classifying component). It can be determined whether the current environment data satisfy the application program environment data corresponding to the at least one condition component of the multiple condition components. When the current environment data satisfy the application program environment data corresponding to the at least one condition component of the multiple condition components, the at least one condition component satisfied by the current environment data can be determined to be the at least one condition component matching the current environment data.

In various embodiments, "application program environment data corresponding to a condition component" can refer to application program environment data consistent with the condition component. In other words, the condition of the condition component, and the behavior component having the condition component mounted are consistent with the application program environment data. When current environment data satisfy the at least one condition component (i.e., causing the at least one condition component to return 'True'), the current environment data also satisfy the application program environment data corresponding to the at least one condition component.

As used herein, wherever applicable, satisfying application program environment data refers to meeting or complying with the application program environment data. Satisfying a condition component refers to meeting, complying with, or being consistent with, the condition component.

For illustrative purposes, the following example can demonstrate the AI server obtains a behavior component matching the current environment data from the classifying component corresponding to the notification message. For example, in a certain application program, a player can play cards against a computer. According to rules of the application program, the player needs to compare value with cards played by an AI agent that the computer acts as. The player or the computer can win by playing a card that is in the same suit with, but has a greater value than, a card played by the other side.

Assuming that in one round, the player plays a 5-of-Hearts card. In order to compete according the rules of the application program, the AI agent needs to play a card greater than the 5-of-Hearts card.

In this case, the AI server can obtain a behavior component matching the current environment data from the classifying component corresponding to the notification message using the following process. For example, among the all application program environment data, the AI server can find application program environment data corresponding to at least one condition component of the multiple condition components. The AI server can thus find condition component(s) corresponding to playing a card greater than the 5-of-Hearts card played by the player. The AI server can then determine which cards currently held by the AI agent match the condition component(s) corresponding to the player's playing a card greater than the 5-of-Hearts card, and the condition component(s) can be found from the all application program environment data. Assuming the AI agent currently has a 10-of-Hearts card, a K-of-Hearts card, and an A-of-Hearts card, in this case, the AI server can determine that the current environment data matches application program environment data corresponding to three condition components. At this time, the AI server can determine that the three condition components satisfied by the current environment data are the at least one condition component matching the current environment data.

In the example as described above, the all application program environment data can include anything related to the gaming environment, e.g., cards the player and the AI agent each have. The application program environment data can include cards the AI agent currently has and can play. For example, the application program environment data can include a 10-of-Hearts card, a K-of-Hearts card, and an A-of-Hearts card, and/or other cards the AI agent currently have. Condition components corresponding to the application program environment data can refer to condition components consistent with the cards the AI agent currently have.

Still referring to the example as described above, the current environment data can include that the player currently plays the 5-of-Hearts card. When the current environment data satisfy the three condition components corresponding to the application program environment data, it can mean that, according to pre-designed game rules (implemented via the mounting structures of components), the current environment data satisfy the conditions of the three condition components corresponding to playing the three cards (10-of-Hearts card, a K-of-Hearts card, and an A-of-Hearts card). In other words, the current environment data satisfy the application program environment data.

In the component topology structure as shown in FIG. 4(a), a behavior component can have at least one condition component mounted thereon. Therefore, the AI server can activate the behavior component having the three condition components mounted. In addition, because a selecting component has the behavior component(s) mounted, the selecting component of the behavior component(s) that has the three condition components mounted can select a behavior component matching the current environment data from the at least one behavior component, according to preset filtering rule(s).

For example, in the application program, a playing card with a symbol A is the greatest value, a playing card with a symbol K is the next greatest value, and so on. When the AI server determines that the player has played a 5-of-Hearts card, the AI agent currently has a 10-of-Hearts card, a K-of-Hearts card, and an A-of-Hearts card. In this case, the selecting component can use a random-selection mode to randomly select a card in order to play a card greater than the card played by the player. However, because two high-value cards of Hearts are all held by the AI agent, the AI agent can play any one of the K-of-Hearts card and the A-of-Hearts card in order to defeat the player in this round. Therefore, in this case, the AI server can select one card from the K-of-Hearts card and the A-of-Hearts card using maximum-weight-selection mode. Further, because the K-of-Hearts card is smaller than the A-of-Hearts card, in this case, the AI agent can play the K-of-Hearts card to defeat the player and does not need to play the A-of-Hearts card. Therefore, the AI server can calculate to decide that the K-of-Hearts card should be played using the preset maximum-weight-selection mode.

Thus, the AI server can determine that the behavior component having the condition component corresponding to the K-of-Hearts card mounted is the behavior component matching the current environment data, and further, can determine that an AI behavior of playing the K-of-Hearts card to be the behavior matching the current environment data. At this time, the AI server has determined that an AI behavior of playing the K-of-Hearts card is the behavior matching the current playing of the 5-of-Hearts card by the player.

Optionally, after the AI behavior is determined based on the behavior component matching the current environment data, the disclosed method can further include the following steps. The AI server executes the AI behavior, generates a result of executing the AI behavior, and sends the result of executing the AI behavior to the application logic server. For example, in the example of playing card as described above, after the AI server executes the AI behavior of playing the K-of-Hearts card, the result of executing the AI behavior is sent to the application logic server corresponding to the application program. In this case, the result obtained by the application logic server is that the AI agent has played a K-of-Hearts card.

In the method according to various disclosed embodiments, an AI system corresponding to an application identifier can be found from multiple preset AI systems. A classifying component corresponding to a notification message can be found from the AI system corresponding to the application identifier. A behavior component matching current environment data can be obtained via the classifying component corresponding to the notification message. An AI behavior can be determined based on the behavior component matching the current environment data. Thus, AI behavior no longer needs to be determined via operation code. An AI behavior can be directly determined by determining an AI behavior component from multiple components that form the AI system. The operation can be simplified. In addition, the operation of determining an AI behavior can be achieved without using an application logic server. Thus, operation speed of the application program can be improved, and users can be provided with desired operation experience.

Figure 5:
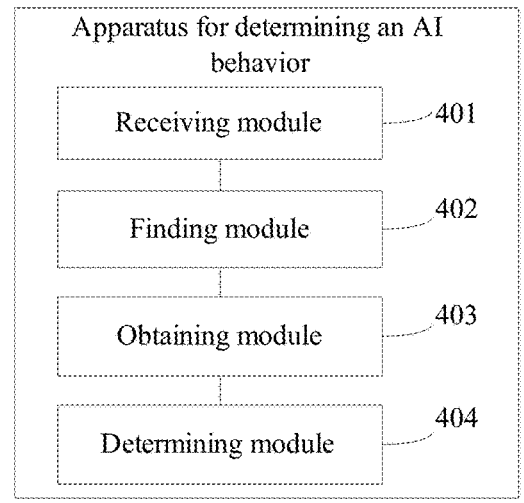
FIG. 5 depicts a structure diagram of an exemplary apparatus for determining an AI behavior in accordance with various disclosed embodiments.

FIG. 5 depicts a structure diagram of an exemplary apparatus for determining an AI behavior in accordance with various disclosed embodiments. As shown in FIG. 5, the apparatus can include a receiving module 401, a finding module 402, an obtaining module 403, and/or a determining module 404. Certain modules can be omitted and other modules can be included.

The receiving module 401 is configured to receive a protocol-requesting command sent by an application logic server. The protocol-requesting command can contain an application identifier, a notification message, and current environment data.

The finding module 402 is configured to find an AI system corresponding to the application identifier from multiple preset AI systems, and find a classifying component corresponding to the notification message from the AI system corresponding to the application identifier. The AI system can be formed by preset multiple components. The preset multiple components can include one or more classifying components. The classifying component can have at least one behavior component mounted thereon.

The obtaining module 403 is configured to obtain a behavior component matching the current environment data from the classifying component corresponding to the notification message. The determining module 404 is configured to determine an AI behavior based on the behavior component matching the current environment data.

Figure 6:
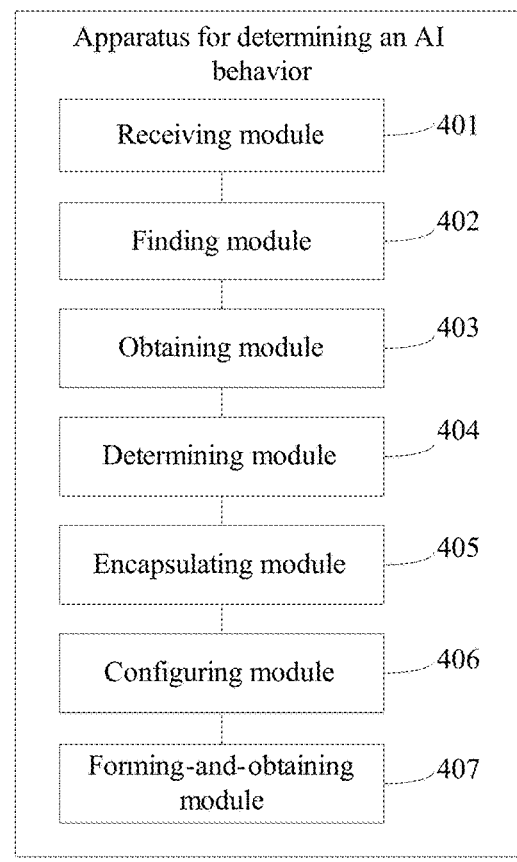
FIG. 6 depicts a structure diagram of another exemplary apparatus for determining an AI behavior in accordance with various disclosed embodiments.

FIG. 6 depicts a structure diagram of another exemplary apparatus for determining an AI behavior in accordance with various disclosed embodiments. As shown in FIG. 6, the apparatus can optionally include an encapsulating module 405, a configuring module 406, and/or a forming module 407. The forming module 407 can also be referred to as a getting module 407, a second obtaining module 407, or a forming-and-obtaining module 407.

The encapsulating module 405 is configured to encapsulate code for achieving specific functions into components for achieving specific functions. The components can include classifying component, selecting component, condition component, and/or behavior component. The configuring module 406 is configured to select multiple groups of the encapsulated components and, for each group of components, configure a classifying component is for managing the group of components. The forming-and-obtaining module 407 is configured to form an AI system of an application program using one or more of each group of components and the classifying component for managing the each group of components, to obtain AI systems corresponding to multiple application programs.

Optionally, the classifying component for managing the group of components that is configured by the configuring module 406 can have at least one selecting component or at least condition component mounted thereon. A selecting component can have at least one behavior component mounted thereon. A behavior component can have at least one condition component mounted thereon.

Figure 7:
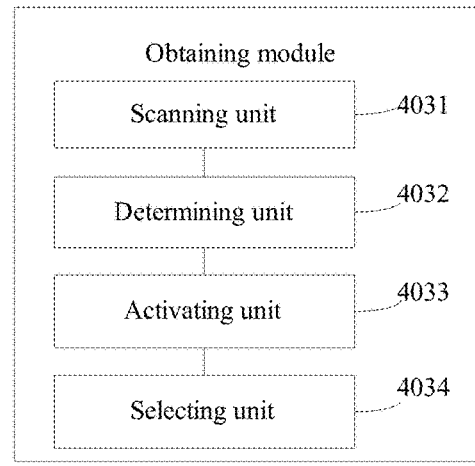
FIG. 7 depicts a structure diagram of an exemplary determining module in accordance with various disclosed embodiments.

FIG. 7 depicts a structure diagram of an exemplary determining module in accordance with various disclosed embodiments. As shown in FIG. 7, the obtaining module 403 can include, but is not limited to, a scanning unit 4031, a determining unit 4032, an activating unit 4033, and/or a selecting unit 4034. Certain unit s can be omitted and other units can be included.

The scanning unit 4031 is configured to scan multiple condition components mounted on the classifying component corresponding to the notification message. The determining unit 4032 is configured to determine at least one condition component matching the current environment data.

The activating unit 4033 is configured to activate at least one behavior component mounted on the at least one condition component matching the current environment data. The selecting unit 4034 is configured to select, using a selecting component on which the at least one behavior component is mounted, a behavior component matching the current environment data from the at least one behavior component.

Optionally, the receiving module 401 is further configured to receive all application program environment data synchronized by the application logic server. The determining unit 4032 is further configured to find, from the all application program environment data, application program environment data corresponding to at least one condition component of the multiple condition components, and to determine whether the current environment data satisfy the application program environment data corresponding to the at least one condition component of the multiple condition components. When the current environment data satisfy the application program environment data corresponding to the at least one condition component of the multiple condition components, the at least one condition component satisfied by the current environment data can be determined to be the at least one condition component matching the current environment data.

By using the apparatus according to various disclosed embodiments, an AI system corresponding to an application identifier can be found from multiple preset AI systems. A classifying component corresponding to a notification message can be found from the AI system corresponding to the application identifier. A behavior component matching current environment data can be obtained via the classifying component corresponding to the notification message. An AI behavior can be determined based on the behavior component matching the current environment data. Thus, AI behavior no longer needs to be determined via operation code. An AI behavior can be directly determined by determining an AI behavior component from multiple components that form the AI system. The operation can be simplified. In addition, the operation of determining an AI behavior can be achieved without using an application logic server. Thus, operation speed of the application program can be improved, and users can be provided with desired operation experience.

Various embodiments also provide an AI server. The AI server can include an apparatus for determining AI behavior. The apparatus can be the same or similar to the apparatus in accordance with various disclosed embodiments, e.g., as shown in FIGS. 5-7.

By using the AI server according to various disclosed embodiments, an AI system corresponding to an application identifier can be found from multiple preset AI systems. A classifying component corresponding to a notification message can be found from the AI system corresponding to the application identifier. A behavior component matching current environment data can be obtained via the classifying component corresponding to the notification message. An AI behavior can be determined based on the behavior component matching the current environment data. Thus, AI behavior no longer needs to be determined via operation code. An AI behavior can be directly determined by determining an AI behavior component from multiple components that form the AI system. The operation can be simplified. In addition, the operation of determining an AI behavior can be achieved without using an application logic server. Thus, operation speed of the application program can be improved, and users can be provided with desired operation experience.

Figure 8:
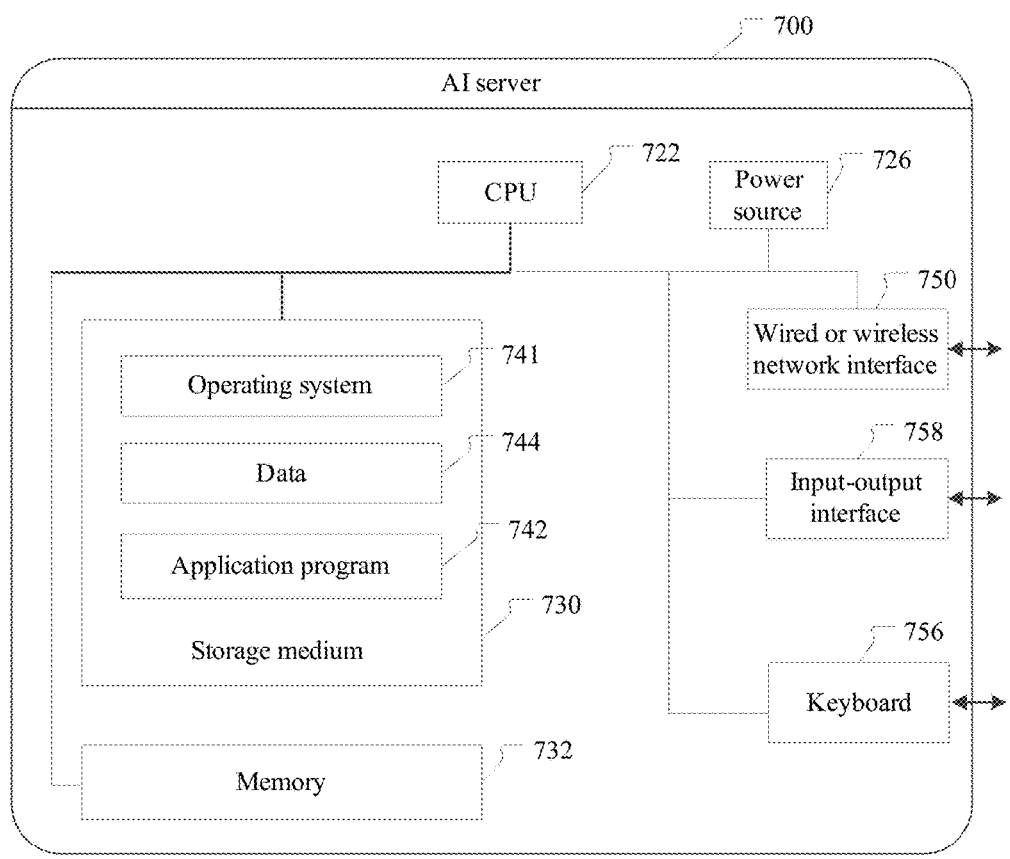
FIG. 8 depicts a structure diagram of an exemplary AI server in accordance with various disclosed embodiments.

FIG. 8 depicts a structure diagram of an exemplary AI server in accordance with various disclosed embodiments. The AI server 700 as shown in FIG. 8 may various significantly depending on configuration or performance, and is not limited by the structure shown in FIG. 8. The AI server 700 can include on or more central processing units (CPU) 722 (e.g., one or more processors), a memory 732, one or more storage media 730 that has application program(s) 742 and/or data 744 stored (e.g., one or more mass storage devices). The memory 732 and the storage medium 730 may include temporary storage or persistent storage. Programs stored on the storage medium 730 may include one or more modules. Each module can include a series of instructions for operating the server. Further, the CPU 722 can be configured to communicate with the storage medium 730, and to execute the series of instructions stored on the storage medium 730 to operate the server 700.

The AI server 700 may further include one or more power sources 726, one or more wired or wireless network interfaces 750, one or more input-output interfaces 758, one or more keyboards 756, and/or one or more operating systems 741, e.g., Windows Server™, Mac OS X™, Unix™, Linux™, FreeBSD™, or any other appropriate operating systems.

When the apparatus for determining AI behavior as disclosed in various embodiments determines an AI behavior, the functional modules are divided as above for illustrative purposes. In practical applications, according to actual needs, the above-described functions can be allocated to different functional modules to be accomplished. That is, the internal structure of the apparatus can be divided into different functional modules to accomplished part or all of the above-described functions. Further details of the apparatus for determining AI behavior are described in the methods for determining AI behavior according various embodiments.

In certain embodiments, AI components can be classified and combined using the following ways. For example, a behavior component can be a component that can execute a specified function. A behavior component can be mounted on a selecting component, and can have a condition component mounted thereon.

Figure 9A:
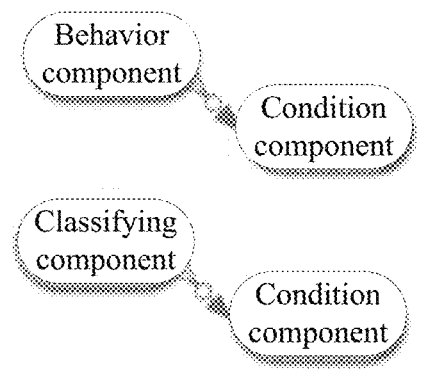
FIGS. 9A-9F depict classifying and combining components in accordance with various disclosed embodiments.

FIGS. 9A-9F depict classifying and combining components in accordance with various disclosed embodiments. As shown in FIG. 9A, a condition component can be mounted on a behavior component or a classifying component.

In addition, a condition component can have other conditions, i.e., other condition component(s), embedded or mounted. A condition component can be used for executing judgment for condition(s), to determine whether a component having the condition component mounted can be selected. Condition components can be divided into two categories including logic-relation condition component and logic condition component.

A logic-relation condition component can determine a logic relation between logic condition components that are mounted thereon. The logic relation can include, e.g., AND, OR, NOT, and any other appropriate relations.

Figure 9B:
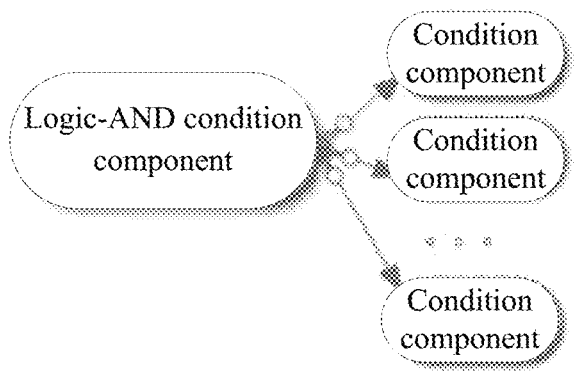

A logic-AND condition component (as shown in FIG. 9B) returns True when all the logic condition components mounted thereon returns True. Otherwise, when not all the logic condition components mounted thereon returns True, the logic-AND condition component returns False. When no logic condition components are mounted thereon, the logic-AND condition component can return False.

Figure 9C:
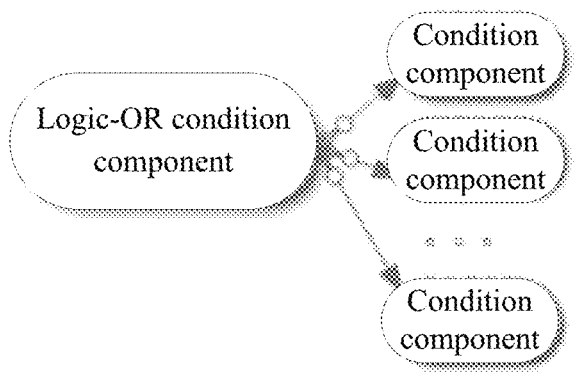

A logic-OR condition component (as shown in FIG. 9C) returns True when one or more of the logic condition components mounted thereon returns True. Otherwise, when none of the logic condition components mounted thereon returns True, the logic-OR condition component returns False. When no logic condition components are mounted thereon, the logic OR condition component can return False.

Figure 9D:
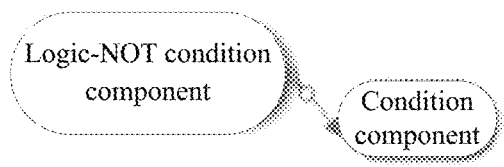

A logic-NOT condition component (as shown in FIG. 9D) can have only one condition component mounted thereon. The logic-NOT condition component returns False when the mounted condition components mounted thereon returns True. Otherwise, when the mounted condition components mounted thereon returns False, the logic-NOT condition component returns True. When no logic condition components are mounted thereon, the logic-NOT condition component can return False.

A logic condition component can include a logic condition. Various logic conditions can have various meanings, respectively. Whether a logic condition is determined to be True can be determined according to protocol data and game environment data that request a matching AI behavior. For example, a logic condition component can determine whether an AI agent is alive, or determine whether an AI agent is in a state of walking, etc.

Figure 9E:
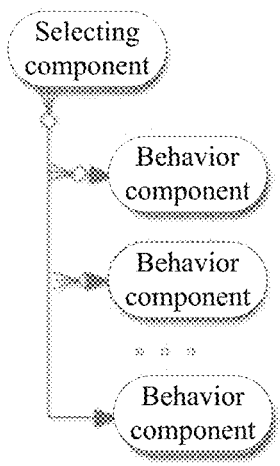
Figure 9F:
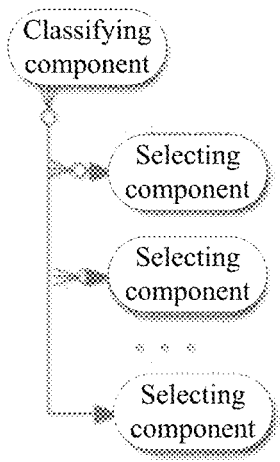

A selecting component can select a behavior component for executing according to a certain filtering rule(s). A selecting component can be mounted on a classifying component, and can have multiple behavior components mounted thereon, e.g., as shown in FIG. 9E. A classifying component can have multiple selecting components mounted thereon, e.g., as shown in FIG. 9F.

Figure 10:
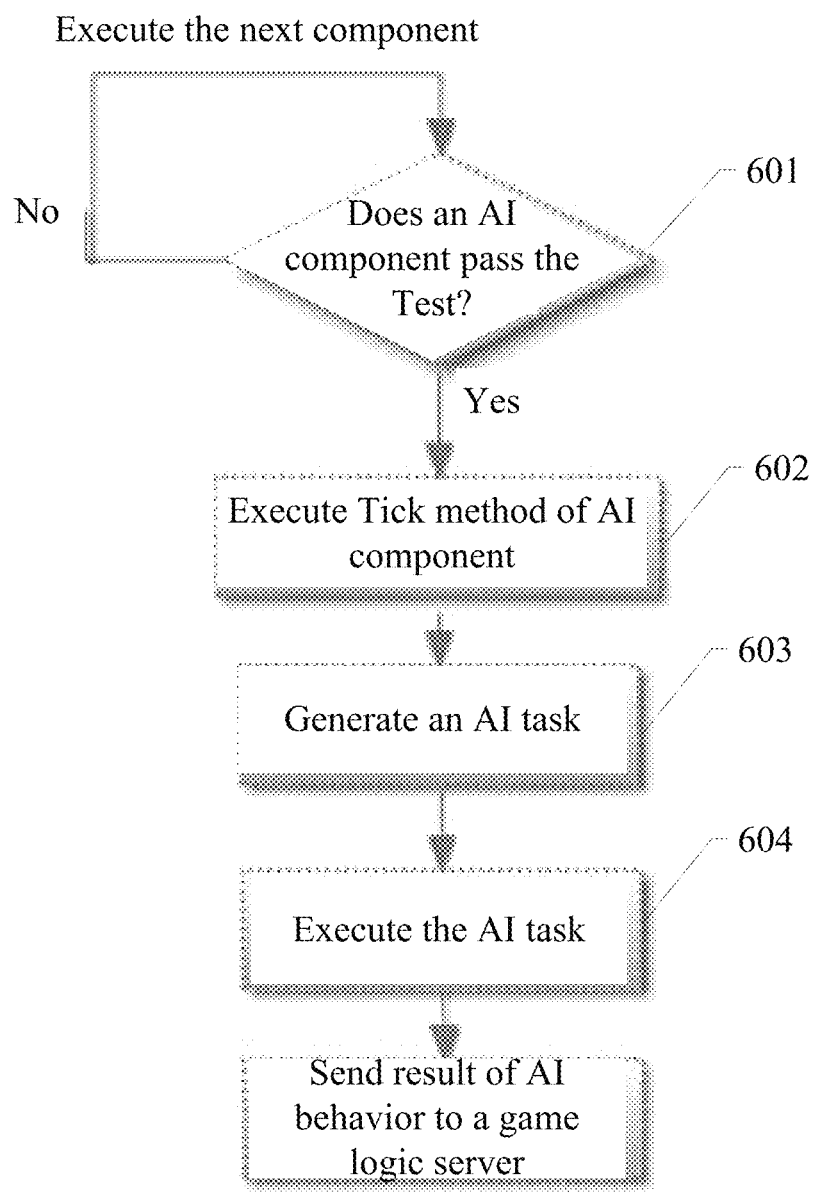
FIG. 10 depicts an exemplary process of calling an AI component in accordance with various disclosed embodiments.

FIG. 10 depicts an exemplary process of calling an AI component in accordance with various disclosed embodiments. As shown in FIG. 10, in Step 601, a method for testing an AI component is executed. The method for testing the AI component can be referred to as a Test.

In Step 602, when the AI component passes the Test, a corresponding calculation method is executed. The calculation method can be referred to as a Tick. When the AI component does not pass the Test, a next component can be looked for and found, and Step 601 can be executed.

In Step 603, an AI task is generated. Only an AI behavior component can generate the AI task. Other components can generate a Dummy Task.

In Step 604, an AI behavior result is obtained. The AI behavior result can be sent to a corresponding game logic server via agreement or protocol.

Figure 11:
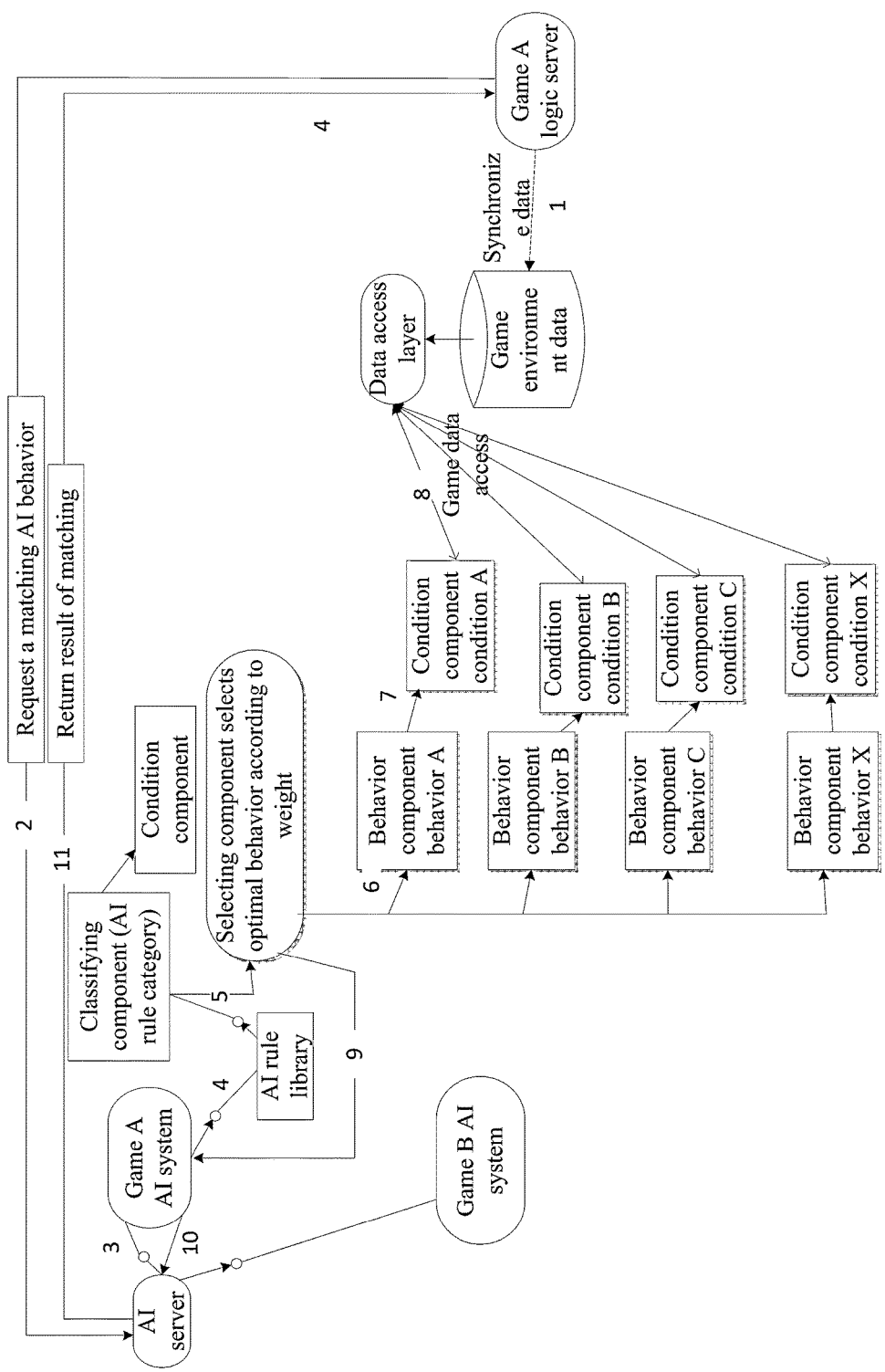
FIG. 11 depicts an exemplary interactive process between AI components and peripheral systems in accordance with various disclosed embodiments.

FIG. 11 depicts an exemplary interactive process between AI components and peripheral systems in accordance with various disclosed embodiments. As shown in FIG. 11, componentization of AI can meet the needs of AI calculation for various games. Via receiving interaction protocols between a game logic server and a user of a client using an AI server, a corresponding AI system can calculate a currently-optimal user behavior or AI behavior, and send the currently-optimal user behavior or AI behavior to the game logic server via the interaction protocols.

The game logic server can be configured to provide service of specific game-play logic for multiple clients, synchronize game environment data to a corresponding AI system on the AI server, and request a matching AI behavior (i.e., an AI behavior matching game environment data), and receive the result of the operation from the AI server. For example, in the Legend of Heroes game, the game logic server can be MainSvr.

An AI server can have any AI systems of various games mounted thereon. Each AI system can be loaded with a specified AI rule library, and can cache or buffer the matching game environment data. For example, in the Legend of Heroes game, the AI server can be AISvr. For example, one AI system can contain one or more AI rule libraries.

A data access layer (DataProxyImpl) can be used for implementing access interface for the game environment data, and can provide data service for the AI components. The AI rule library can be formed by and include classifying components (used as main categories after classifying AI rule), selecting components, behavior components, and/or condition components. The AI rule library can include the components organized as a tree structure.

Referring to FIG. 11, an interaction process between AI components and peripheral systems can include the following steps. In Step 1, a game logic server synchronizes game environment data to a corresponding AI system or AI server via socket. Mechanism of the synchronization can include full-synchronization mode or incremental-synchronization mode.

In Step 2, the game logic server requests a current matching AI behavior from the AI server. In Step 3, the game logic server locates an appropriate AI system.

In Step 4, the AI system finds a corresponding AI rule library according to a current protocol-requesting command. In Step 5, the AI rule finds a corresponding classifying component according to data of the current protocol-requesting command.

In Step 6, the classifying component attempts to match the data of the current protocol-requesting command with behavior components under various selecting component. In Step 7, the behavior components are matched using condition components.

In Step 8, the condition components determine whether a current condition component passes (i.e., returns True), according to data of the current protocol-requesting command, and by having the data access layer inquiring the current game environment data. In Step 9, when a condition of a condition component mounted on a behavior component passes, the behavior component is screened by its parent component (i.e., a selecting component), via maximum-weight-selection mode, random-selection mode, sequential-selection mode, or any other appropriate modes. The selecting component can thus select an optimal behavior component and submit the optimal behavior component to the AI system.

In Step 10, the AI system executes the current optimal behavior component and sends a result of the executing to the AI server. In Step 11, the AI server sends the result (i.e., the result of the operation) to the game logic server via socket.

Part or all of the steps in the methods in accordance with various embodiments can be accomplished using hardware, or using a program/software to instruct related hardware. The program/software can be stored in a non-transitory computer-readable storage medium including, e.g., ROM/RAM, magnetic disk, optical disk, etc.

The embodiments disclosed herein are exemplary only. Other applications, advantages, alternations, modifications, or equivalents to the disclosed embodiments are obvious to those skilled in the art and are intended to be encompassed within the scope of the present disclosure.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The disclosed methods, apparatus and artificial intelligence (AI) servers can be used in a variety of computer applications. The computer applications can include any application programs that involve AI technology. The application programs can include, but are not limited to, games, online transaction, and computer-aided interactive learning.

By using the methods, apparatus, and AI servers according to various disclosed embodiments, an AI system corresponding to an application identifier can be found from multiple preset AI systems. A classifying component corresponding to a notification message can be found from the AI system corresponding to the application identifier. A behavior component matching current environment data can be obtained via the classifying component corresponding to the notification message. An AI behavior can be determined based on the behavior component matching the current environment data. Thus, AI behavior no longer needs to be determined via operation code. An AI behavior can be directly determined by determining an AI behavior component from multiple components that form the AI system. The operation can be simplified. In addition, the operation of determining an AI behavior can be achieved without using an application logic server. Thus, operation speed of the application program can be improved, and users can be provided with desired operation experience.

What is claimed is:

1. A method for determining an artificial intelligence (AI) behavior, comprising:
receiving a protocol-requesting command sent by an application logic server, wherein the protocol-requesting command contains an application identifier, a notification message, and current environment data;
finding, from a plurality of preset AI systems, an AI system related to the application identifier via looking up and finding a storage structure matching the application identifier from different storage structures, wherein the AI system is formed by a preset plurality of components, the preset plurality of components including one or more classifying components;
finding, from the AI system related to the application identifier, a classifying component related to the notification message, wherein the classifying component is mounted with at least one behavior component;
obtaining, from the classifying component related to the notification message, a behavior component matching the current environment data; and
determining an AI behavior based on the obtained behavior component matching the current environment data.

2. The method according to claim 1, wherein, before finding the AI system related to the application identifier from the plurality of preset AI systems, the method further includes:
encapsulating code for achieving specific functions into components for achieving the specific functions, wherein the components for achieving the specific functions include selecting components, condition components, and behavior components;

selecting a plurality of groups of components from the components for achieving the specific functions, and configuring a classifying component for component managing of each group of the plurality of groups of components; and forming one AI system including the each group of the plurality of groups of components, and the each group including the classifying component for component managing, the one AI system related to one application program;

obtaining the plurality of AI systems related to a plurality of application programs.

3. The method according to claim 2, wherein:

the classifying component for component managing is mounted with at least one selecting component or at least one condition component;

the at least one selecting component is mounted with at least one behavior component; and the at least one behavior component is mounted with the at least one condition component.

4. The method according to claim 1, wherein the obtaining of the behavior component matching the current environment data from the classifying component related to the notification message includes:

scanning a plurality of condition components mounted on the classifying component related to the notification message, to determine at least one condition component matching the current environment data;

activating at least one behavior component mounted with the at least one condition component matching the current environment data; and selecting, by using a selecting component mounted with the at least one behavior component, the behavior component matching the current environment data from the at least one behavior component, based on a filtering rule.

5. The method according to claim 4, wherein before receiving the protocol-requesting command sent by the application logic server, the method further includes:

receiving all application program environment data synchronized with the application logic server; and wherein the scanning of the plurality of condition components mounted on the classifying component related to the notification message to determine the at least one condition component matching the current environment data includes:

finding, among the all application program environment data, application program environment data related to the at least one condition component of the plurality of condition components, and determining whether the current environment data satisfy the application program environment data related to the at least one condition component of the plurality of condition components; and when the current environment data satisfy the application program environment data related to the at least one condition component of the plurality of condition components, determining the at least one condition component of the plurality of condition components satisfied with the current environment data as the at least one condition component matching the current environment data.

6. An apparatus for determining an AI behavior, comprising:

a memory;

a processor coupled to the memory;

a plurality of program modules stored in the memory to be executed by the processor, the plurality of program modules comprising:

a receiving module configured to receive a protocol-requesting command sent by an application logic server, wherein the protocol-requesting command contains an application identifier, a notification message, and current environment data;

a finding module configured to:

find, from a plurality of preset AI systems, an AI system related to the application identifier via looking up and finding a storage structure matching the application identifier from different storage structures, wherein the AI system is formed by a preset plurality of components, the preset plurality of components include one or more classifying components; and find, from the AI system related to the application identifier, a classifying component related to the notification message, wherein the classifying component is mounted with at least one behavior component;

an obtaining module configured to obtain, from the classifying component related to the notification message, a behavior component matching the current environment data; and a determining module configured to determine an AI behavior based on the obtained behavior component matching the current environment data.

7. The apparatus according to claim 6, the plurality of program modules further including:

an encapsulating module configured to encapsulate code for achieving specific functions into components for achieving the specific functions, wherein the components for achieving the specific functions include selecting components, condition components, and behavior components;

a configuring module configured to select a plurality of groups of components from the components for achieving the specific functions, and configure a classifying component for component managing of each group of the plurality of groups of components; and a forming-and-obtaining module configured to:

form one AI system including the each group of the plurality of groups of components and the classifying component for component managing of the each group, the one AI system related to one application program; and obtain the plurality of AI systems related to a plurality of application programs.

8. The apparatus according to claim 7, wherein:

the classifying component for component managing of the each group of components is mounted with at least one selecting component or at least one condition component;

the at least one selecting component is mounted with at least one behavior component; and the at least one behavior component is mounted with the at least one condition component.

9. The apparatus according to claim 6, wherein the obtaining module includes:

a scanning unit configured to scan a plurality of condition components mounted on the classifying component related to the notification message;

a determining unit configured to determine at least one condition component matching the current environment data;
an activating unit configured to activate at least one behavior component mounted with the at least one condition component matching the current environment data; and
a selecting unit configured to select, by using a selecting component mounted with the at least one behavior component, the behavior component matching the current environment data from the at least one behavior component, based on a filtering rule.

10. The apparatus according to claim 9, wherein:
the receiving module is further configured to:
receive all application program environment data synchronized with the application logic server; and
the determining unit is configured to:
find, among the all application program environment data, application program environment data related to the at least one condition component of the plurality of condition components, and determine whether the current environment data satisfy the application program environment data related to the at least one condition component of the plurality of condition components; and
when the current environment data satisfy the application program environment data related to the at least one condition component of the plurality of condition components, determine the at least one condition component of the plurality of condition components satisfied with the current environment data as the at least one condition component matching the current environment data.

11. A non-transitory computer-readable medium having computer program for, when being executed by a processor, performing a method for determining an artificial intelligence (AI) behavior, the method comprising:
receiving a protocol-requesting command sent by an application logic server, wherein the protocol-requesting command contains an application identifier, a notification message, and current environment data;
finding, from a plurality of preset AI systems, an AI system related to the application identifier via looking up and finding a storage structure matching the application identifier from different storage structures, wherein the AI system is formed by a preset plurality of components, the preset plurality of components including one or more classifying components;
finding, from the AI system related to the application identifier, a classifying component related to the notification message, wherein the classifying component is mounted with at least one behavior component;
obtaining, from the classifying component related to the notification message, a behavior component matching the current environment data; and
determining an AI behavior based on the obtained behavior component matching the current environment data.

12. The non-transitory computer-readable medium according to claim 11, wherein, before finding the AI system related to the application identifier from the plurality of preset AI systems, the method further includes:
encapsulating code for achieving specific functions into components for achieving the specific functions, wherein the components for achieving the specific functions include selecting components, condition components, and behavior components;
selecting a plurality of groups of components from the components for achieving the specific functions, and configuring a classifying component for component managing of each group of the plurality of groups of components; and
forming one AI system including the each group of the plurality of groups of components and the classifying component for component managing of the each group, the one AI system related to one application program;
obtaining the plurality of AI systems related to a plurality of application programs.

13. The non-transitory computer-readable medium according to claim 12, wherein:
the classifying component for component managing of the each group of components is mounted with at least one selecting component or at least one condition component;
the at least one selecting component is mounted with at least one behavior component; and
the at least one behavior component is mounted with the at least one condition component.

14. The non-transitory computer-readable medium according to claim 11, wherein the obtaining of the behavior component matching the current environment data from the classifying component related to the notification message includes:
scanning a plurality of condition components mounted on the classifying component related to the notification message, to determine at least one condition component matching the current environment data;
activating at least one behavior component mounted with the at least one condition component matching the current environment data; and
selecting, by using a selecting component mounted with the at least one behavior component, the behavior component matching the current environment data from the at least one behavior component, based on a filtering rule.

15. The non-transitory computer-readable medium according to claim 14, wherein before receiving the protocol-requesting command sent by the application logic server, the method further includes:
receiving all application program environment data synchronized with the application logic server; and
wherein the scanning of the plurality of condition components mounted on the classifying component related to the notification message to determine the at least one condition component matching the current environment data includes:
finding, among the all application program environment data, application program environment data related to the at least one condition component of the plurality of condition components, and determining whether the current environment data satisfy the application program environment data related to the at least one condition component of the plurality of condition components; and
when the current environment data satisfy the application program environment data related to the at least one condition component of the plurality of condition components, determining the at least one condition component of the plurality of condition components satisfied with the current environment data as the at least one condition component matching the current environment data.

16. The method according to claim 1, wherein when the notification message includes a message that informing the AI system of playing a card, the application logic server obtains the behavior component from the classifying component of playing basic playing cards to determine the AI behavior of the AI system.

17. The method according to claim 4, wherein the filtering rule comprises a maximum-weight-selection mode, a random-selection mode, a sequential-selection mode, or any other appropriate modes.

* * * * *